Aug. 15, 1933.    R. J. S. PIGOTT    1,922,777
SAFETY DEVICE
Filed Nov. 13, 1930    4 Sheets-Sheet 1

Inventor
Reginald J. S. Pigott
By Bacon & Thomas.
Attorneys

Inventor
Reginald J. S. Pigott
By Bacon and Thomas
Attorneys

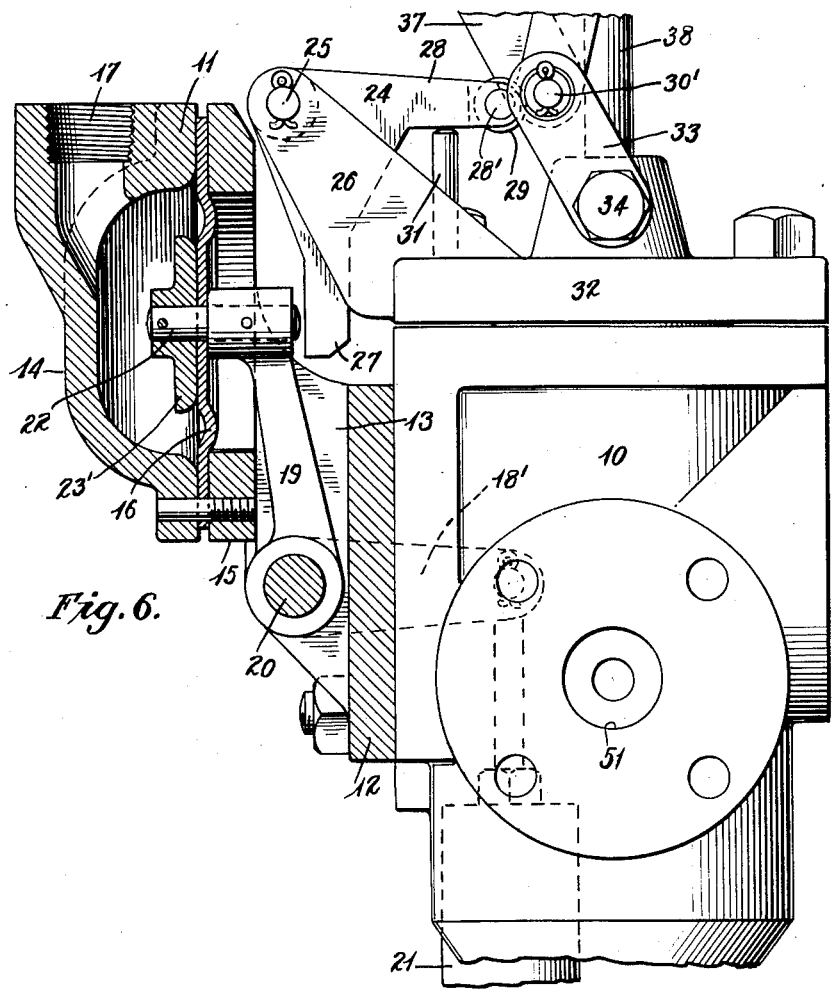
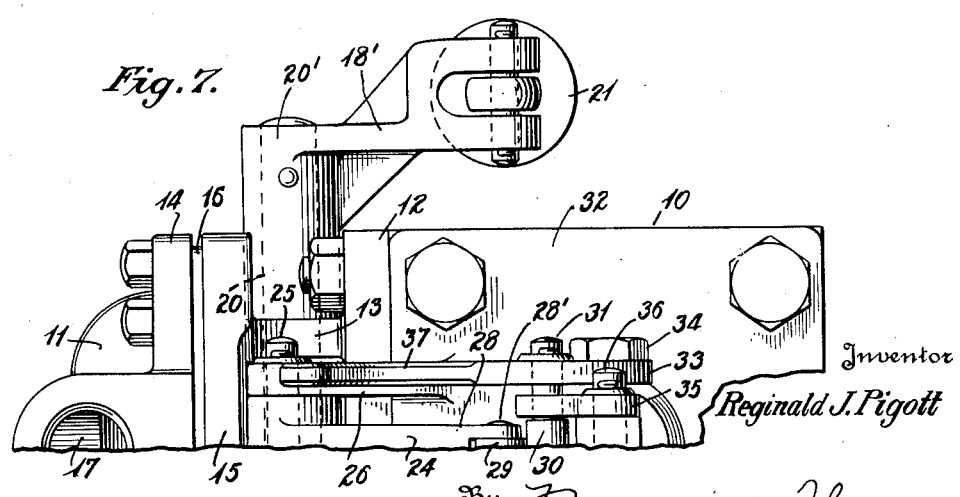

Patented Aug. 15, 1933

1,922,777

UNITED STATES PATENT OFFICE 1,922,777

SAFETY DEVICE

Reginald J. S. Pigott, Pittsburgh, Pa.

Application November 13, 1930
Serial No. 495,495

16 Claims. (Cl. 137—139)

My invention relates to safety devices and more particularly has reference to a tripping mechanism which is actuated by variations in pressure or vacuum upon an instrumentality to be protected.

It is an object of the present invention to provide an automatically pressure or vacuum actuated safety device adapted for association with any machine or mechanism to be rendered inoperative upon the development of an abnormal or unsafe pressure or vacuum condition.

A further object of my invention resides in the provision of a safety or control device which is automatically actuated when a predetermined pressure is exceeded or when a predetermined vacuum is diminished within the mechanism or machine to be controlled or protected.

Another object of my invention is to provide an automatically actuated valve responsive to variations in pressure or vacuum to shut down a machine upon the existence of abnormal pressure or vacuum conditions in the latter.

A further object of my invention is to provide safety or control mechanism of the character referred to which is reliable and efficient in its operation.

Other objects and advantages of my invention will be apparent from the more detailed description thereof.

For a fuller understanding of the invention reference will be had to the accompanying drawings wherein:

Figure 6 is a fragmentary elevation, partly in section, of a modified construction adapted to be actuated by decrease in sub-atmospheric pressure or vacuum below a predetermined limit;

Figure 7 is a fragmentary plan view of the construction illustrated in Figure 6.

My invention is particularly applicable to the tripping of the control throttle of a steam turbine to closed position beyond certain predetermined limits and the invention will therefore be described with reference to such use. However, it will be understood that my improved safety or control mechanism may be applied to any machine or instrumentality which is to be controlled or rendered inoperative through pressure or vacuum variations beyond certain fixed limits.

Figure 1:
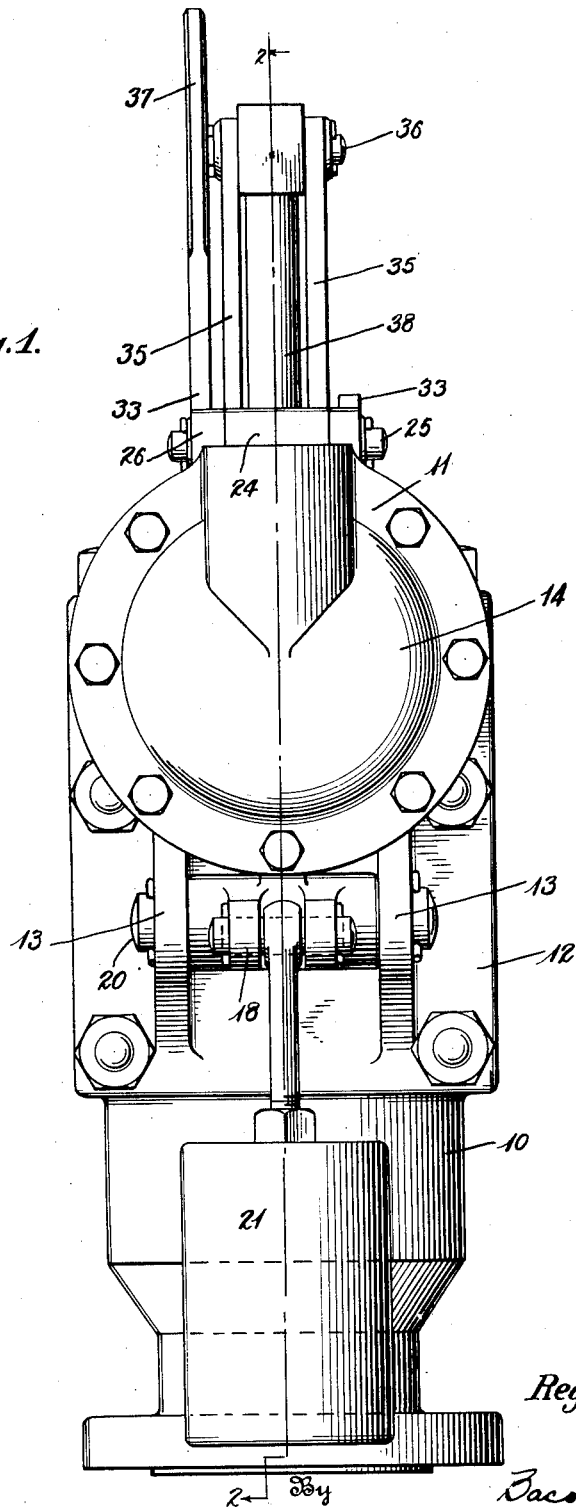
Figure 1 is an end view of my improved safety device and adapted to be actuated by an increase of superatmospheric pressure above a predetermined maximum.
Figure 2:
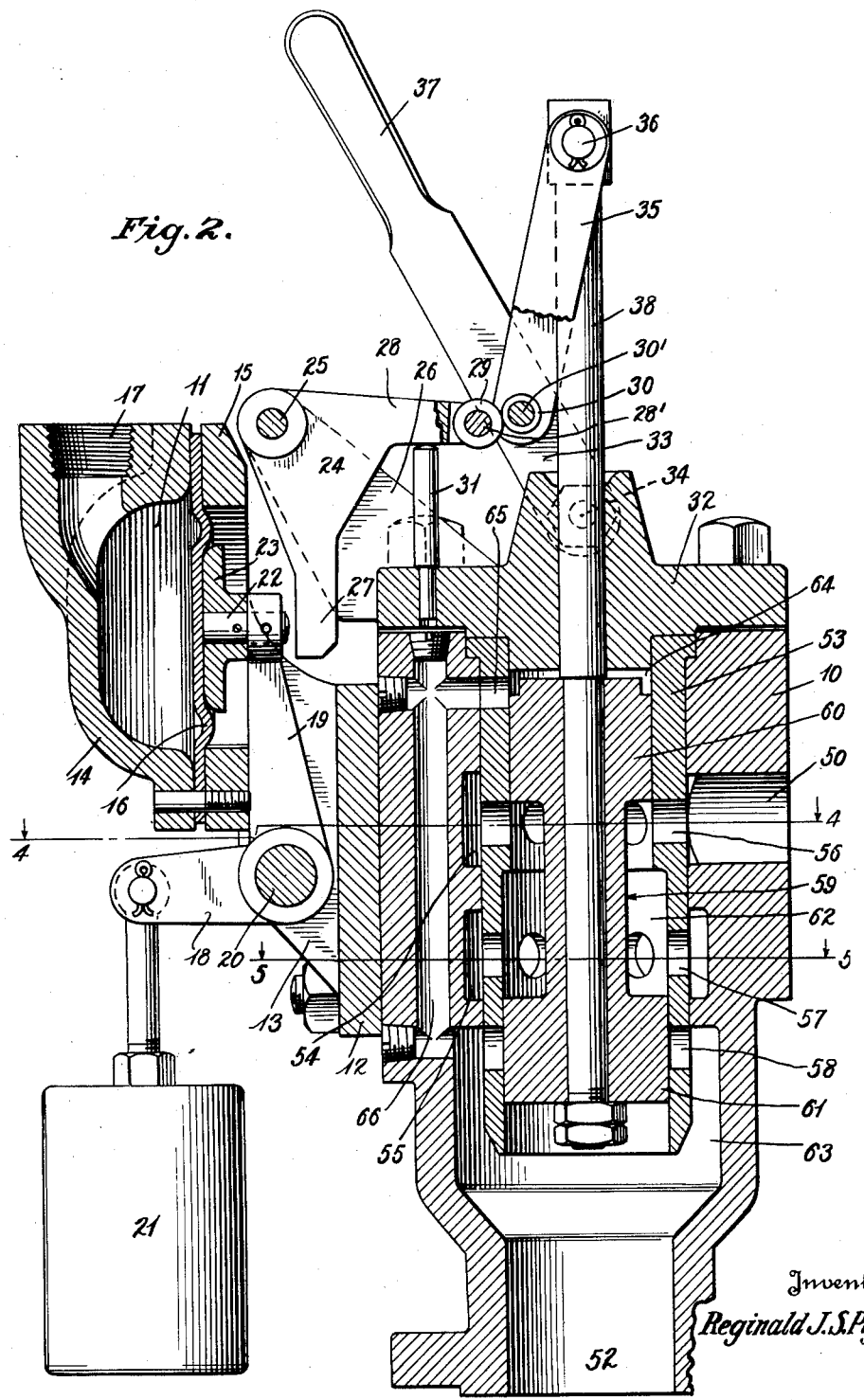
Figure 2 is a sectional view taken on the line 2—2 of Figure 1.
Figure 3:
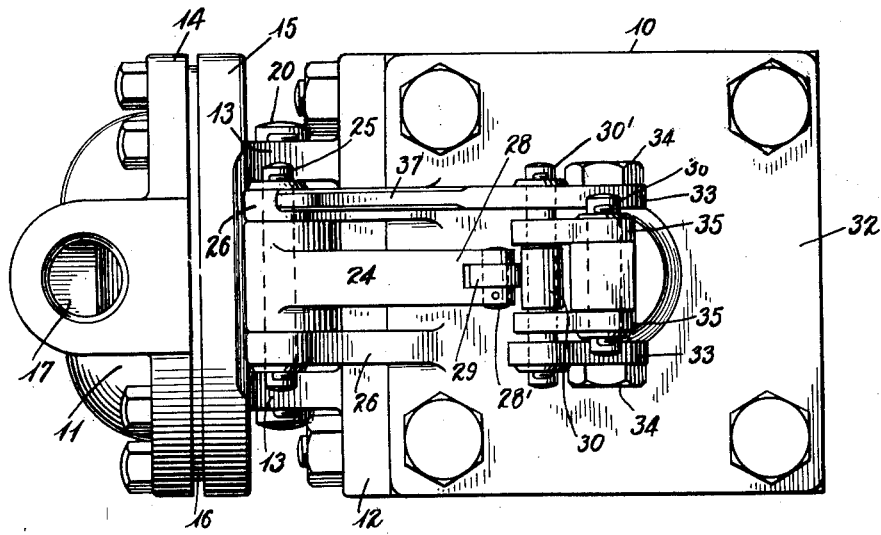
Figure 3 is a plan view of the construction illustrated in Figures 1 and 2.

Referring more particularly to the drawings and especially to the superatmospheric pressure actuated device of Figures 1, 2 and 3, at 10 is shown a valve body to which a diaphragm chamber 11 is secured by means of plate 12 and brackets 13. The diaphragm chamber comprises a cover member 14 and an annular ring 15 held together by circumferentially spaced bolts and nuts as shown and between which is clamped a flexible diaphragm 16. The cover 14 of the diaphragm chamber is provided with a threaded opening 17 which is adapted to be connected to the exhaust casing of a steam turbine or other apparatus in which undue rise of pressure is to be controlled or guarded against. A bell crank comprising horizontal lever 18 and vertical lever 19 is pivoted between brackets 13 on pivot 20, the leftward movement of lever 19 being limited by contact with ring 15 as shown. A weight 21 is suspended from lever 18 as shown while lever 19 carries, by means of stud or pin 22, a mushroom member 23 which presses against diaphragm 16 by reason of weight 21. The arrangement is such that the diaphragm will be held against flexing to the right until a predetermined pressure, corresponding to the load of weight 21, within chamber 11 has been reached or exceeded, in which event mushroom 23 and stud 22 will be pushed by the diaphragm in the direction of the valve body against the action of weight 21. In other words, the diaphragm is normally balanced by the weight on one side and the turbine exhaust pressure on the other side and flexes rightwardly only when the load of the weight is equalled or exceeded by the pressure load within the diaphragm chamber, the weight representing the predetermined maximum pressure at which the safety mechanism is to be automatically operated to shut down the turbine. It will, of course, be obvious that a spring may be substituted for the weight to counterbalance the diaphragm but a weight is preferable as it has a sharper tripping point and is more reliable than a spring.

A trip crank 24 is pivoted upon pin 25 between fixed brackets 26 and comprises the depending arm 27 in the path of movement of stud 22 and the lateral arm 28. In the normal setting of the device as shown in Figure 2, the end of stud or pin 22 is clear of arm 27. A pin 28' on arm 28 carries a roller 29 which normally engages a second roller 30 in the manner shown in Figure 2 of the drawings, roller 30 being mounted on pin 30' between pairs of links hereinafter described. Trip crank 24 is so mounted that the center of roller 29 is normally just below the line joining the center of fulcrum or pivot point 25 and roller 30 and is supported in this position by means of a stop pin 31 secured in head 32 of the valve body. The center of gravity of trip crank 24 is to the right of pivot point 25 and the crank tends to remain by gravity in the untripped or normal position shown in Figure 2.

A pair of links 33 is pivoted by means of shoulder screws 34 to valve head 32 while a second pair of links 35 is connected between pin 30' carrying roller 30 and pin 36, the pin 30' passing through all four links. A re-setting handle 37 is formed as an extension of one of the links 33. A pilot valve stem 38 carrying a weighted and downwardly biased pilot valve hereinafter described is suspended from pin 36. The links 33 and 35 form with pins 30', 34 and 36 a toggle system which will support a considerable downward pull on valve stem 38 with a very light lateral pressure between roller 29 of arm 28 and roller 30 on pin 30', the knee of the toggle. The pilot valve hereinafter described is such as to exert a downward pull on stem 38 which retains roller 30 pressed against roller 29 in the manner best shown in Figure 2.

From the construction thus far described, it will be seen that when normal pressure conditions prevail in the exhaust casing of the turbine and consequently in diaphragm chamber 11 connected thereto, the safety device is retained in its normal setting or untripped position as shown in Figure 2. Upon abnormal rise of pressure at the turbine exhaust and in chamber 11, the pressure increase will be promptly transmitted to diaphragm 16 until a point is reached, for example 7 pounds gage pressure, at which the total pressure load against the turbine side of the diaphragm equals the load from weight 21 upon the opposite side of the diaphragm. Thereupon the diaphragm flexes to the right carrying with it mushroom 23 and stud 22, the latter striking arm 27, tripping crank 24 upwardly and releasing support roller 29 against roller 30. The downward pull and pressure bias of the weighted pilot valve, hereinafter described, upon valve stem 38 folds up the toggle formed by links 33 and 35, roller 30 slides under roller 29, and the pilot valve descends within valve body 10 to the tripped or closed position. Handle 37 constitutes a means for manually resetting the device and raising the descended pilot valve to its normal or open position and it will be noted that the device cannot be reset until the pressure in diaphragm chamber 11 has been reduced below the tripping value as represented by weight 21.

Figure 4:
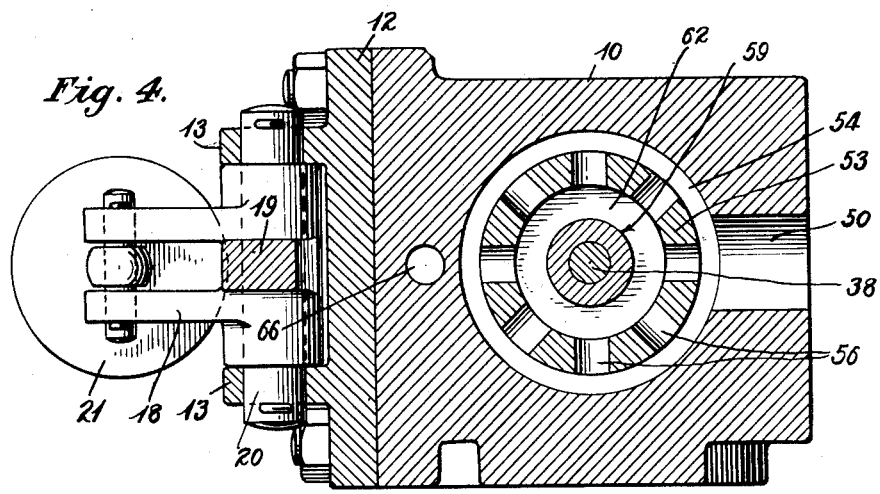
Figure 4 is a sectional view on the line 4—4 of Figure 2.
Figure 5:
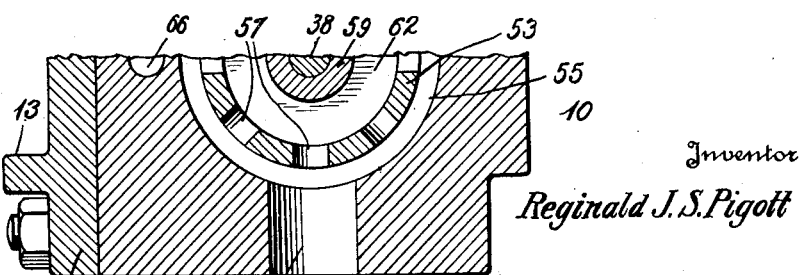
Figure 5 is a fragmentary section on the line 5—5 of Figure 2.

Referring now to the pilot valve assembly alluded to above and best illustrated in Figures 2, 4 and 5, valve body 10 is provided with an upper inlet port 50, an intermediate outlet port 51 shown in Fig. 5 at a right angle to port 50, and a bottom outlet 52. The valve body contains an inner liner 53 provided with vertically spaced passages 54 and 55 and with upper ports 56, intermediate ports 57 and lower ports 58. The valve proper, indicated generally at 59 and mounted on stem 38 as shown, comprises an upper piston 60 and a lower piston 61 which is greater in diameter than the upper piston. The lower piston is made larger than the upper piston by an amount sufficient to impart a pressure bias or a downward pull upon stem 38, this insuring reliable operation as otherwise the weight of valve 59, stem 38 and links 33 and 35 may not be sufficient to bring about downward movement of the valve when crank 24 and roller 29 are tripped upwardly as above explained. A valve chamber 62 is formed within liner 53 between pistons 60 and 61 and an exhaust passage 63 is formed between the lower portions of the liner and valve body. Liner 53 is pressed into valve body 10 sufficiently tight to prevent leakage between passages 54, 55, and 63.

Upper port 50 is adapted for flanged pipe connection to a pressure oil supply and, when the valve is in the normal position shown in Figure 2 of the drawings, permits oil to enter pilot valve chamber 62 through passage 54 and upper ports 56 in the liner. Intermediate port 51, at right angles to port 50 in the valve body and somewhat lower, is connected to the throttle trip cylinder or the primary valve cylinder of the turbine and communicates with valve chamber 62 through passage 55 and ports 57. The throttle trip cylinder or the primary valve cylinder referred to constitute known elements in turbine installation and are such as to require a supply of oil pressure in order to remain open while a drop in oil pressure closes the valves. These devices, being well known, require no further description or illustration and form no part of the present invention. Bottom outlet port 52 communicates with the oil reservoir of the turbine and the exhaust oil flows back to the supply tank by gravity. In the normal position of the valve as shown in Figure 2, communication between valve chamber 62 and outlet 52 through ports 58 and exhaust passage 63 is closed by means of lower piston 61 of the valve while communication between ports 50 and 51 is open through valve chamber 62.

In the set or normal position of the valve as shown in Figure 2, it will be seen that the pressure oil supply is in communication with the throttle trip cylinder or the primary valve cylinder of the turbine through upper port 50 in the valve body, passage 54, upper ports 56, valve chamber 62, intermediate ports 57, passage 55, and intermediate port 51 in the valve body. Accordingly, by reason of the oil pressure supply, the throttle trip or primary valve cylinder remains open and the turbine operates in the customary manner. However, when the pressure at the turbine exhaust, and consequently in diaphragm chamber 11, equals the predetermined maximum as represented by weight 21 and when the safety mechanism is tripped by the abnormal pressure in the manner already explained, the valve descends to a position where upper piston 60 covers ports 56 and lower piston 61 uncovers ports 58. In this tripped position of the valve it will be seen that communication between upper port 50 and intermediate port 51 in the valve body is closed while communication between ports 51 and outlet 52 is open through passage 55, ports 57, ports 58 and exhaust passage 63. Accordingly, all oil pressure is released from the throttle or primary cylinders causing the valves to close, thus completing the tripping operation and shutting down the turbine, the released pressure oil flowing by gravity from outlet 62 back to the oil reservoir of the turbine. As already explained, when the pressure in diaphragm chamber 11 is reduced below the tripping value, the complete assembly may be re-set by the manual operation of handle 37.

The space 64 between upper piston 60 and cylinder head 32 is in continuous communication with exhaust passage 63 through port 65 in the upper part of liner 53 and passage 66 arranged vertically within the valve body. This connection maintains chamber 64 at exhaust pressure and would entirely balance valve 59 if pistons 60 and 61 were of equal size but, as already explained, the lower piston is made larger to give a reasonable bias or pressure downward to the valve. A further purpose of maintaining exhaust (or atmospheric) pressure in chamber 64 is to prevent the small quantity of oil which always leaks past piston 60 from leaking through the sliding joint between stem 38 and valve cover 32. It is not desirable to pack this sliding contact against leakage since to do so would introduce a variable friction on the valve stem 38 which might interfere with tripping.

In Figures 6 and 7 I have illustrated slight variations in my improved safety mechanism whereby the device is actuated by a reduction of a predetermined vacuum to be controlled. In this modified construction the mushroom 23' is positioned within the diaphragm chamber on the left of the diaphragm, the pivot 20 extended beyond the valve body as shown at 20', and a lever 18', from which the weight 21 is suspended, is substituted for lever 18 of the bell crank and pivoted about extension 20'. The weight now tends to pull the diaphragm 16, mushroom 23' and stud 22 to the right rather than tending to push these elements to the left as in the pressure actuated device and the weight counterbalances a predetermined vacuum instead of a predetermined pressure. Except for the variations noted, the construction of Figures 6 and 7 is substantially the same as that of Figures 1 to 5 and requires no further description. In the modification of Figures 6 and 7, it will be seen that when the vacuum within the diaphragm chamber falls below a predetermined value the safety mechanism is tripped in the same manner as explained in connection with the pressure actuated device.

In the appended claims where I refer to mechanisms responsive to or actuated by pressure variations, I mean the term "pressure" to be generic to atmospheric, subatmospheric and superatmospheric pressure and the claims are to be so construed.

Having described my invention, what I claim is:

1. A safety device for the control mechanism of a machine to be rendered inoperative upon abnormal pressure variation, which comprises a pilot valve through which fluid pressure is adapted to be transmitted to said control mechanism or exhausted therefrom, means for normally locking said valve in position to transmit fluid pressure through the valve to said control mechanism, and means adapted to be actuated by abnormal pressure variations in said machine for operating said pilot valve to cut off the transmission of fluid pressure to said control mechanism and to release the fluid pressure upon said control mechanism.

2. A safety device for the control mechanism of a machine to be rendered inoperative upon abnormal pressure variation, which comprises a pilot valve through which fluid pressure is adapted to be transmitted to said control mechanism and exhausted therefrom, means including a pivoted member for normally holding the pilot valve in position to transmit fluid pressure through the valve to said control mechanism, a flexible diaphragm responsive to pressure variations, and means actuated by movement of said diaphragm for tripping said pivoted member and to thereby release the holding means, said pilot valve being adapted to move upon release of the holding means to release the fluid pressure upon said control mechanism.

3. A safety device for the control mechanism of a machine to be rendered inoperative upon abnormal pressure variation, which comprises a pilot valve through which fluid pressure is adapted to be transmitted to said control mechanism, means for normally locking said valve in position to transmit fluid pressure through the valve to said control mechanism, and means adapted to be actuated by abnormal pressure variations in said machine for releasing the locking means, said pilot valve being weighted to descend by gravity upon release of the locking means to cut off transmission of fluid pressure to said control mechanism and to release the fluid pressure upon said control mechanism.

4. In combination, a toggle mechanism and a valve suspended therefrom, retaining means acting upon said toggle mechanism to prevent movement of the valve, and means responsive to pressure variations for releasing said retaining means to permit movement of the valve.

5. In combination, a weighted valve suspended from a toggle, a stop member acting on the knee of said toggle to hold the valve in elevated position, a flexible diaphragm responsive to pressure variations, and means actuated by movement of said diaphragm for releasing said stop member to permit descent of said valve.

6. In combination, a weighted valve suspended from a toggle, a roller at the knee of said toggle, a second roller acting on the first mentioned roller to retain the valve in elevated position, and means responsive to pressure variations for tripping said second roller upwardly to permit descent of the valve.

7. In combination, a weighted valve suspended from a toggle, a roller at the knee of the toggle, a pivoted member, a second roller on said member and normally engaging the first mentioned roller to prevent folding of said toggle, a balanced flexible diaphragm responsive to pressure variations, and means actuated by movement of said diaphragm for tripping said member.

8. In combination, a weighted valve suspended from a toggle, a roller at the knee of said toggle, a pivoted trip crank having a depending arm and a lateral arm, a second roller on said lateral arm normally engaging the first mentioned roller to prevent folding of said toggle, a pressure responsive flexible diaphragm, a pivoted bell crank having a horizontal lever and a vertical lever, a weight suspended from said horizontal lever, and a stud fixed to said vertical lever and engaging said diaphragm and adapted to strike said depending arm when the diaphragm is flexed.

9. In combination with a device to be operated, a toggle mechanism connected to said device and permitting movement of the latter into operative and inoperative positions, a stop member acting on the knee of said toggle mechanism to retain said device in the operative position, and means actuated by pressure variations for releasing said stop member from engagement with the knee of the toggle mechanism to permit said device to move into the inoperative position.

10. A safety device comprising a valve, a toggle connected to said valve and permitting the latter to assume open and closed positions, a stop member acting on the knee of said toggle to retain the valve in open position, and means actuated by pressure variations for tripping said member to permit the valve to assume the closed position.

11. A safety device comprising a weighted valve suspended from a toggle, a stop member acting on the knee of said toggle to retain said valve in an elevated open position, and pressure responsive means for tripping said member to permit descent of said valve to closed position.

12. A safety device comprising in combination: a valve casing having an upper inlet port, an intermediate outlet port, and a lower outlet port; a valve within said casing having an upper piston and a larger lower piston forming a valve chamber therebetween; retaining means for holding said valve in elevated position to maintain communication between said upper and intermediate ports through said chamber and to close communication between said chamber and said lower port by said lower piston; and pressure responsive means for releasing said retaining means to permit descent of said valve to close said upper port and establish communication between said intermediate and lower ports through said chamber.

13. A safety device comprising in combination: a valve casing having an upper inlet port, an intermediate outlet port, and a lower outlet port; a weighted valve within said casing adapted to maintain communication between said upper and intermediate ports and to close communication between said intermediate and lower ports when in elevated position and adapted to close said upper port and establish communication between said intermediate and lower ports when in lowered position; retaining means for holding said valve in the elevated position; and means actuated by pressure variations for releasing said retaining means to permit descent of the valve to the lowered position.

14. In a device for rendering a machine inoperative upon abnormal pressure variations in said machine, a valve through which fluid pressure is adapted to be transmitted, an operating member in said valve upon which said fluid pressure is exerted, said member having a first area upon which said fluid pressure exerts a force in a direction to open the valve, and a second area upon which said fluid pressure exerts a force in a direction to close the valve, said second area being slightly greater than the first, whereby the valve is biased toward closed position by said fluid pressure, means to lock the valve in open position, and means adapted to be actuated by abnormal pressure variations in said machine to release said locking means.

15. In a device for rendering a machine inoperative upon abnormal pressure variations in said machine, a valve through which fluid pressure is adapted to be transmitted, an operating member in said valve upon which said fluid pressure is exerted, said member having a first area upon which said fluid pressure exerts a force in a direction to open the valve, and a second area upon which said fluid pressure exerts a force in a direction to close the valve, said second area being slightly greater than the first, whereby the valve is biased toward closed position by said fluid pressure, a toggle mechanism connected to said valve and permitting movement of said valve into open and closed position, a stop member acting upon the knee of said toggle mechanism to retain said valve in open position, and means actuated by abnormal pressure variations in said machine to release said stop member from engagement with the knee of said toggle mechanism.

16. In combination, a valve suspended from a toggle, a roller at the knee of the toggle, a pivot, a pivoted member on said pivot, a second roller positioned on said pivoted member and normally engaging the first mentioned roller to prevent folding of said toggle, said second roller being positioned below a line through the center of said pivot and the center of said first roller, and means responsive to pressure variations for raising said pivoted member to release the knee of said toggle.

REGINALD J. S. PIGOTT.